(12) United States Patent  
Kay et al.

(10) Patent No.: US 7,679,534 B2
(45) Date of Patent: Mar. 16, 2010

(54) CONTEXTUAL PREDICTION OF USER WORDS AND USER ACTIONS

(75) Inventors: David Jon Kay, Seattle, WA (US); Ethan R. Bradford, Seattle, WA (US); Pim van Meurs, Kenmore, WA (US); Peter C. Peddie, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 0 days.

(21) Appl. No.: 10/866,634

(22) Filed: Jun. 10, 2004

(65) Prior Publication Data

US 2005/0017954 A1    Jan. 27, 2005

Related U.S. Application Data

(63) Continuation-in-part of application No. 10/176,933, filed on Jun. 20, 2002, which is a continuation-in-part of application No. 09/454,406, filed on Dec. 31, 1999.

(60) Provisional application No. 60/110,890, filed on Dec. 4, 1998, provisional application No. 60/504,240, filed on Sep. 19, 2003.

(51) Int. Cl.
*H03K 17/94* (2006.01)

(52) U.S. Cl. ............... 341/22; 455/412.2; 455/414.1; 704/10; 710/67; 715/708

(58) Field of Classification Search ............... 341/22; 704/10; 710/67, 73; 455/414.1, 412.2; 379/418; 715/708, 812

See application file for complete search history.

(56) References Cited

U.S. PATENT DOCUMENTS 3,967,273 A    6/1976   Knowlton 4,164,025 A    8/1979   Dubnowski et al.

(Continued)

FOREIGN PATENT DOCUMENTS

EP    0319193    6/1989
EP    0464726    1/1992

(Continued)

OTHER PUBLICATIONS

Ajioka, Y, Anzai, Y., "Prediction of Next Alphabets and Words of Four Sentences by Adaptive Injunctions"; IJCNN-91- Seattle: Intnl Joint Conference on Neural Networks (Cat. No. 91CH3049-4) p. 897, vol. 2; IEEE, NY, NY 1991 USA.

(Continued)

*Primary Examiner*—Timothy Edwards, Jr.
(74) *Attorney, Agent, or Firm*—Michael A. Glenn; Glenn Patent Group

(57) ABSTRACT

The invention concerns user entry of information into a system with an input device. A scheme is provided in which an entire word that a user wants to enter is predicted after the user enters a specific symbol, such as a space character. If the user presses an ambiguous key thereafter, rather than accept the prediction, the selection list is reordered. For example, a user enters the phrase "Lets run to school. Better yet, lets drive to "."" After the user presses the space, after first entering the second occurrence of the word "to," the system predicts that the user is going to enter the word "school" based on the context in which the user has entered that word in the past. Should the user enter an ambiguous key after the space, then a word list which contains the word "school" is reordered and other options are made available to the user. The invention can also make predictions on context, such as the person to whom the message is sent, the person writing the message, the day of the week, the time of the week, etc. Other embodiments of the invention contemplate anticipation of user actions, as well as words, such as a user action in connection with menu items, or a user action in connection with form filling.

6 Claims, 4 Drawing Sheets

U.S. PATENT DOCUMENTS

| | | |
|---|---|---|
| 4,191,854 A | 3/1980 | Coles |
| 4,339,806 A | 7/1982 | Yoshida |
| 4,360,892 A | 11/1982 | Endfield |
| 4,396,992 A | 8/1983 | Hayashi et al. |
| 4,427,848 A | 1/1984 | Tsakanikas |
| 4,442,506 A | 4/1984 | Endfield |
| 4,464,070 A | 8/1984 | Hanft et al. |
| 4,481,508 A | 11/1984 | Kamei et al. |
| 4,544,276 A | 10/1985 | Horodeck |
| 4,586,160 A | 4/1986 | Amano et al. |
| 4,649,563 A | 3/1987 | Riskin |
| 4,661,916 A | 4/1987 | Baker et al. |
| 4,669,901 A | 6/1987 | Feng |
| 4,674,112 A | 6/1987 | Kondraske et al. |
| 4,677,659 A | 6/1987 | Dargan |
| 4,744,050 A | 5/1988 | Hirosawa et al. |
| 4,754,474 A | 6/1988 | Feinson |
| RE32,773 E | 10/1988 | Goldwasser et al. |
| 4,791,556 A | 12/1988 | Vilkaitis |
| 4,807,181 A | 2/1989 | Duncan, IV et al. |
| 4,817,129 A | 3/1989 | Riskin |
| 4,866,759 A | 9/1989 | Riskin |
| 4,872,196 A | 10/1989 | Royer et al. |
| 4,891,786 A | 1/1990 | Goldwasser |
| 4,969,097 A | 11/1990 | Levin |
| 5,018,201 A | 5/1991 | Sugawara |
| 5,031,206 A | 7/1991 | Riskin |
| 5,041,967 A | 8/1991 | Ephrath et al. |
| 5,067,103 A | 11/1991 | Lapeyre |
| 5,131,045 A | 7/1992 | Roth |
| 5,133,012 A | 7/1992 | Nitta |
| 5,163,084 A | 11/1992 | Kim et al. |
| 5,200,988 A | 4/1993 | Riskin |
| 5,218,538 A | 6/1993 | Zhang |
| 5,229,936 A | 7/1993 | Decker et al. |
| 5,255,310 A | 10/1993 | Kim et al. |
| 5,258,748 A | 11/1993 | Jones |
| 5,289,394 A | 2/1994 | Lapeyre |
| 5,303,299 A | 4/1994 | Hunt et al. |
| 5,305,205 A | 4/1994 | Weber et al. |
| 5,339,358 A | 8/1994 | Danish et al. |
| 5,388,061 A | 2/1995 | Hankes |
| 5,392,338 A | 2/1995 | Danish et al. |
| 5,535,421 A | 7/1996 | Weinreich |
| 5,559,512 A | 9/1996 | Jasinski et al. |
| 5,642,522 A | 6/1997 | Zaenen et al. |
| 5,664,896 A | 9/1997 | Blumberg |
| 5,680,511 A | 10/1997 | Baker et al. |
| 5,748,512 A | 5/1998 | Vargas |
| 5,786,776 A | 7/1998 | Kisaichi et al. |
| 5,797,098 A | 8/1998 | Schroeder et al. |
| 5,805,911 A | 9/1998 | Miller |
| 5,818,437 A | 10/1998 | Grover et al. |
| 5,825,353 A | 10/1998 | Will |
| 5,847,697 A | 12/1998 | Sugimoto |
| 5,855,000 A | 12/1998 | Waibel et al. |
| 5,917,890 A | 6/1999 | Brotman et al. |
| 5,917,941 A | 6/1999 | Webb et al. |
| 5,926,566 A | 7/1999 | Wang et al. |
| 5,936,556 A | 8/1999 | Sakita |
| 5,937,380 A | 8/1999 | Segan |
| 5,937,422 A | 8/1999 | Nelson et al. |
| 5,952,942 A | 9/1999 | Balakrishnan et al. |
| 5,960,385 A | 9/1999 | Skiena et al. |
| 5,999,950 A | 12/1999 | Krueger et al. |
| 6,005,498 A | 12/1999 | Yang et al. |
| 6,009,444 A | 12/1999 | Chen |
| 6,041,323 A | 3/2000 | Kubota |
| 6,044,347 A | 3/2000 | Abella et al. |
| 6,054,941 A | 4/2000 | Chen |
| 6,098,086 A | 8/2000 | Krueger et al. |
| 6,120,297 A | 9/2000 | Morse, III et al. |
| 6,130,628 A | 10/2000 | Schneider-Hufschmidt et al. |
| 6,169,538 B1 | 1/2001 | Nowlan et al. |
| 6,172,625 B1 | 1/2001 | Jin et al. |
| 6,178,401 B1 | 1/2001 | Franz et al. |
| 6,204,848 B1 | 3/2001 | Nowlan et al. |
| 6,208,966 B1 | 3/2001 | Bulfer |
| 6,219,731 B1 | 4/2001 | Gutowitz |
| 6,223,059 B1 | 4/2001 | Haestrup |
| 6,246,761 B1 * | 6/2001 | Cuddy ........................ 379/418 |
| 6,304,844 B1 | 10/2001 | Pan et al. |
| 6,307,548 B1 * | 10/2001 | Flinchem et al. ............. 715/811 |
| 6,362,752 B1 | 3/2002 | Guo et al. |
| 6,363,347 B1 | 3/2002 | Rozak |
| 6,377,965 B1 | 4/2002 | Hachamovitch et al. |
| 6,392,640 B1 | 5/2002 | Will |
| 6,424,743 B1 | 7/2002 | Ebrahimi |
| 6,466,232 B1 | 10/2002 | Newell et al. |
| 6,502,118 B1 | 12/2002 | Chatterjee |
| 6,542,170 B1 | 4/2003 | Williams et al. |
| 6,574,597 B1 | 6/2003 | Mohri et al. |
| 6,584,179 B1 | 6/2003 | Fortier et al. |
| 6,633,846 B1 | 10/2003 | Bennett et al. |
| 6,646,573 B1 * | 11/2003 | Kushler et al. ................. 341/28 |
| 6,684,185 B1 | 1/2004 | Junqua et al. |
| 6,686,852 B1 | 2/2004 | Guo |
| 6,711,290 B2 | 3/2004 | Sparr et al. |
| 6,728,348 B2 | 4/2004 | Denenberg et al. |
| 6,734,881 B1 | 5/2004 | Will |
| 6,738,952 B1 | 5/2004 | Yamamuro |
| 6,751,605 B2 | 6/2004 | Gunji et al. |
| 6,757,544 B2 | 6/2004 | Rangarjan et al. |
| 6,801,659 B1 | 10/2004 | O'Dell |
| 6,807,529 B2 | 10/2004 | Johnson et al. |
| 6,864,809 B2 | 3/2005 | O'Dell et al. |
| 6,885,317 B1 | 4/2005 | Gutowitz |
| 6,912,581 B2 | 6/2005 | Johnson et al. |
| 6,934,564 B2 | 8/2005 | Laukkanen et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 | 12/2005 | Mirkin et al. |
| 6,982,658 B2 | 1/2006 | Guo |
| 6,985,933 B1 | 1/2006 | Singhal et al. |
| 7,006,820 B1 | 2/2006 | Parker et al. |
| 7,020,849 B1 | 3/2006 | Chen |
| 7,027,976 B1 | 4/2006 | Sites |
| 7,057,607 B2 | 6/2006 | Mayoraz et al. |
| 7,061,403 B2 | 6/2006 | Fux |
| 7,075,520 B2 | 7/2006 | Williams |
| 7,095,403 B2 | 8/2006 | Lyustin et al. |
| 7,139,430 B2 | 11/2006 | Sparr et al. |
| 7,152,213 B2 | 12/2006 | Pu et al. |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Hotsberg |
| 7,386,454 B2 | 6/2008 | Gopinath et al. |
| 7,389,235 B2 | 6/2008 | Dvorak |
| 7,395,203 B2 | 7/2008 | Wu et al. |
| 7,437,001 B2 | 10/2008 | Morwing et al. |
| 7,466,859 B2 | 12/2008 | Chang et al. |
| 2002/0038207 A1 | 3/2002 | Mori et al. |
| 2002/0072395 A1 | 6/2002 | Miramontes |
| 2002/0119788 A1 * | 8/2002 | Parupudi et al. ............. 455/456 |
| 2002/0135499 A1 | 9/2002 | Guo |
| 2002/0152075 A1 | 10/2002 | Kung et al. |
| 2002/0188448 A1 | 12/2002 | Goodman et al. |
| 2003/0011574 A1 | 1/2003 | Goodman |
| 2003/0023420 A1 | 1/2003 | Goodman |
| 2003/0023426 A1 | 1/2003 | Pun et al. |
| 2003/0054830 A1 | 3/2003 | Williams et al. |

| | | |
|---|---|---|
| 2003/0078038 A1 | 4/2003 | Kurosawa et al. |
| 2003/0095102 A1 | 5/2003 | Kraft |
| 2003/0104839 A1 | 6/2003 | Kraft et al. |
| 2003/0119561 A1 | 6/2003 | Hatch et al. |
| 2003/0144830 A1 | 7/2003 | Williams |
| 2003/0179930 A1 | 9/2003 | Conrad et al. |
| 2003/0193478 A1 | 10/2003 | Ng |
| 2004/0049388 A1 | 3/2004 | Roth et al. |
| 2004/0067762 A1 | 4/2004 | Balle |
| 2004/0127197 A1 | 7/2004 | Rosking |
| 2004/0127198 A1* | 7/2004 | Roskind et al. .......... 455/412.2 |
| 2004/0135774 A1 | 7/2004 | La Monica |
| 2004/0153963 A1 | 8/2004 | Simpson et al. |
| 2004/0153975 A1 | 8/2004 | Williams et al. |
| 2004/0155869 A1 | 8/2004 | Robinson et al. |
| 2004/0163032 A1 | 8/2004 | Guo et al. |
| 2004/0169635 A1 | 9/2004 | Ghassabian |
| 2004/0201607 A1* | 10/2004 | Mulvey et al. .............. 345/708 |
| 2004/0203656 A1 | 10/2004 | Andrew et al. |
| 2004/0259598 A1 | 12/2004 | Wagner et al. |
| 2005/0017954 A1 | 1/2005 | Kay et al. |
| 2005/0114770 A1 | 5/2005 | Sacher et al. |
| 2006/0010206 A1 | 1/2006 | Apacible et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0190822 A1 | 8/2006 | Basson et al. |
| 2006/0193519 A1 | 8/2006 | Sternby |
| 2006/0236239 A1 | 10/2006 | Simpson et al. |
| 2006/0239560 A1 | 10/2006 | Sternby |
| 2007/0094718 A1 | 4/2007 | Simpson |
| 2007/0203879 A1 | 8/2007 | Templeton-Steadman et al. |
| 2007/0276814 A1 | 11/2007 | Williams |
| 2007/0285397 A1 | 12/2007 | LaPointe et al. |
| 2008/0130996 A1 | 6/2008 | Sternby |

FOREIGN PATENT DOCUMENTS

| | | |
|---|---|---|
| EP | 0540147 | 5/1993 |
| EP | 0313975 | 12/1994 |
| EP | 0651315 | 5/1995 |
| EP | 0660216 | 6/1995 |
| EP | 2298166 | 8/1996 |
| EP | 0732646 | 9/1996 |
| EP | 0751469 | 8/2002 |
| EP | 1 296216 | 3/2003 |
| EP | 1296216 | 3/2003 |
| EP | 1031913 | 4/2003 |
| EP | 1035712 | 4/2003 |
| EP | 1320023 | 6/2003 |
| EP | 1324573 | 7/2003 |
| EP | 1 347362 | 9/2003 |
| EP | 1347361 | 9/2003 |
| GB | 2298166 | 8/1996 |
| GB | 2383459 | 6/2003 |
| JP | 1990-117218 | 5/1990 |
| JP | 1993-265682 | 10/1993 |
| JP | 8006939 | 1/1996 |
| JP | 1997-114817 | 5/1997 |
| JP | 1997-212503 | 8/1997 |
| JP | 2002-351862 | 12/2002 |
| WO | WO82/00442 | 2/1982 |
| WO | WO90/07149 | 6/1990 |
| WO | WO96/27947 | 9/1996 |
| WO | WO97/04580 | 2/1997 |
| WO | WO97/05541 | 2/1997 |
| WO | WO98-33111 | 7/1997 |
| WO | WO 03/005842 | 7/2003 |
| WO | WO 03/05842 | 7/2003 |
| WO | WO03/058420 | 7/2003 |
| WO | WO03/060451 | 7/2003 |
| WO | WO2004/111871 | 6/2004 |
| WO | WO2006/026908 | 8/2005 |
| WO | WO2004/111812 | 3/2006 |

OTHER PUBLICATIONS

Kronlid, F., Nilsson, V. "TreePredict, Improving Text Entry on PDA's"; Computational Linguistics, Goteborg University, c15fkron@cling.gu.se;Victoria@viktoria.informatics.gu.se.

Zernik, U., "Language Acquisition: Coping with Lexical Gaps", Artificial Intelligence Program, GE R&D Center, Schenectady, NY USA.

Gavalda, M. "Epiphenomenal Grammar Acquisition with GSG"; Interactive Systems Inc., Pittsburgh, PA USA marsal@interactivesys.com.

Cockburn, A., Siresena, "Evaluating Mobile Text Entry with Fastap™ Keyboard"; University of Canterbury, Dept. of Computer Science, Christchurch, New Zeland; ans26@cosc.,canterbury.ac.nz.

Butts, L., Cockburn, A., "An Evaluation of Mobile Phone Text Input Methods", University of Canterbury, Dept of Computer Science, Christchurch, New Zealand AUIC2002, Melbourne Australia, Conferences in Research and Practice in Information Technology, vol. 7; Copyright 2001, Australian Computer Society.

Shieber, S., Baker, E., "Abbreviated Text Input", Harvard University, Cambridge, MA, USA shieber@deas.harvard.edu_ellie@eecs.harvard.edu.

Rosa, J. "Next Word Prediction in a Connectional Distributed Representation System"; 2002 IEEEE IntnlConference on Systems, man and Cybernetics; Conf. Proceedings (Cat. No.: 02CH37349) Part vol. 3, p. 6, Yasmine Hammamet, Tunisia, Oct. 2002.

Rosa, J., "A Biologically Motivated Connectionist System for Predicting the Next Word in Natural Language Sentences", 2002 IEEEE Intnl Conference on Systems, man and Cybernetics; Conf. Proceedings (Cat. No.: 02CH37349) Part vol. 4, p. 6, Yasmine Hammamet, Tunisia, Oct. 2002.

Matsui, "POBox: An efficient Text input Method for Handheld and Ubiquitous Computers"; Sony Computer Science Labs inc. 3-14-13 Higashi-Gotanda, Shinagawa Tokyo 141-0022, Japan.

Yang, Y., Pedersen, J., "A Comparative Study on Feature Selection in Text Categorization"; Carnegie Mellon University: yiming@cs.cmu.edu;ipederse@verity.com.

Martin, T.Azvine, B., "Learning User Models for an Intelligent Telephone Assistant"; Proceedings Joint 9th IFSA World Congress and 20th NAFIPS Intnl. Conf. (Cat. No. 01TH8569) Part vol. 2, p. 669-74 vol. 2; IEEE 2001, Piscataway, NJ, USA.

Dey, A.K. and Abowd, G.D. (1999). Towards a better understanding of context and context-awareness. GVU Technical Report GIT-GVU-99-22, GVU Center, 1999.

P. Coppola, et al. MoBe: a framework for context-aware mobile applications. In: Proc. of Workshop on Context Awareness for Proactive Systems (CAPS2005), Helsinki University Press. 2005; ISBN: 952-10-2518-2.

A. Schmidt, et al. Advanced interaction in context. In Proceedings of First International Symposium on Handheld and Ubiquitous Computing, pp. 89-101, Karlsruhe, Germany, Sep. 1999.

D.P/ Siewiorek, et al. SenSay: a context-aware mobile phone. In Proceedings of the 7th IEEE International Symposium on Wearable Computers, pp. 248-249, IEEE Press, 2003.

Kronlid, F., Nilsson, V. "TreePredict, Improving Text Entry on PDA's"; Computational Linguistics, Goteborg University, c15fkron@cling.gu.se; Victoria@viktoria.informatics.gu.se, 2000.

Zernik, U., "Language Acquisition: Coping with Lexical Gaps", Artificial Intelligence Program, GE R&D Center, Schenectady, NY US, 1990.

Gavalda, M. "Epiphenomenal Grammar Acquisition with GSG"; Interactive Systems Inc., Pittsburgh, PA USA marsal@interactivesys.com.

Cockburn, A., Siresena, "Evaluating Mobile Text Entry with Fastap™ Keyboard"; University of Canterbury, Dept. of Computer Science, Christchurch, New Zealand; ans26@cosc,.canterbury.ac.nz, 2002.

Butts, L., Cockburn, A., "An Evaluation of Mobile Phone Text Input Methods", University of Canterbury, Dept of Computer Science, Christchurch, New Zealand AUIC2002, Melbourne Australia, Conferences in Research and Practice in Information Technology, vol. 7; Copyright 2001, Australian Computer Society.

Shieber, S., Baker, E., "Abbreviated Text Input", Harvard University, Cambridge, MA, USA shieber@deas.harvard.edu ellie@eecs.harvard.edu, 2003.

Rosa, J. "Next Word Prediction in a Connectional Distributed Representation System"; 2002 IEEEE Intnl Conterence on Systems, man and Cybernetics; Conf. Proceedings (Cat. No. 02CH37349) Part vol. 3, p. 6, Yasmine Hammamet, Tunisia, Oct. 2002.

Rosa, J., "A Biologically Motivated Connectionist System for Predicting the Next Word in Natural Language Sentences"; 2002 IEEEE IntnI Conference on Systems, man and Cybernetics; Conf. Proceedings (Cat. No. 02CH37349) Part vol. 4, p. 6, Yasmine Hammamet, Tunisia, Oct. 2002.

Matsui, "POBox: An efficient Text input Method for Handheld arid Ubiquitous Computers"; Sony Computer Science Labs inc. 3-14-13 Higashi-Gotanda, Shinagawa Tokyo 141-0022; Japan, 2000.

Yang, Y., Pedersen, J., "A Comparative Study on Feature Selection in Text Categorization"; Carnegie Mellon University: yiming@cs.cmu.edu; jpederse@verity.com, 1999.

Website printout from Lexicus; www.motorola.com/lexicus/html/itap_FAQ.html, Sep. 6, 2002.

Website Printout from Text Entry for Mobile Computing; www.yorku.ca/mack/hci3.html, Sep. 6, 2002.

Arnott, J.L., et al; *Probabilistic Character Disambiguation for Reduced Keyboards Using Small Text Samples*; Dept. Math & comp. Sci.; Univ of Dundee, Dundee, Tayside, Scotland; AAC Augmentative and Alternative Communication ; vol. 8, Sep. 1992; Copyright 1992 by ISAAC.

Damasco, Patrick W., et al., "Generating Text From Compressed Input: An Intelligent Interface for People with Sever Motor Impairments", Communications of the ACM, vol. 35 No. 5, May 1992, pp. 68-78.

James, Christina L., et al., "Text Input for Mobile Devices: Comparing Model Prediction to Actual Performance", SIGCHI '01, Seattle, WA, Mar. 31 - Apr. 4, 2001, pp. 365-371 [ACM 1-58113-327-08/01/003].

MacKenzie, I. Scott, et al., "LetterWise: Prefix-based Disambiguation for Mobile Text Input" UIST '01, Orlando, FL, Nov. 11-14, 2001, pp. 111-120 [ACM 1-58113-438-x/01/11].

Butts, Lee, et al., "An Evaluation of Mobile Phone Text Input Methods", Australian CS Communications, Tird Australasian Conf. On User Interfaces, vol. 24 Issue 4, Jan. 2002, pp. 55-59 (plus citation page).

Xu, Jinxi, et al., "Corpus-Based Stemming Using Cooccurrence of Word Variants", ACM Transactions on Information Systems, vol. 16 No. 1, Jan. 1998, pp. 61-81 [ACM 1046-8188/98/0100-0061].

Press Release from Telegic Communications, "America Online, Inc. Acquires Tegic Communications", Dec. 1, 1999, pp. 1-3 (downloaded from: www.tegic.com/pressreleases/pr_aolacquisition.html).

News Release from Zi Corporation, "Zi Claims Second Patent Victory Against Tegic Communications, a unit of AOL Time Warner", Mar. 14, 2002, pp. 1-2 (downloaded from: www.zicorp.com/pressreleases/031402.html).

Summary Judgment Orders, *Zi Corporation, Inc.* v. *Tegic Communications, Inc.*, Mar. 13, 2002, pp. 1-7 (downloaded from: www.zicorp.com/pressreleases/031402.html).

Silverberg, Miika, et al., "Bringing Text Input Beyond the Desktop", CHI 2000, The Hague, Amsterdam, Apr. 1-6, 2000, pp. 9-16 [ACM 1-58113-216-6/00/04].

"Latest Philips Wireless Handset Ships With T9 Text Input in China", Business Wire, Nov. 9 1999, pp. 1-2 (downloaded from: www.businesswire.com/webbox/bw.110999/193130342.htm).

Tygran, Amalyan, "T9 or Text Predicative Input in Mobile Telephones", Business Wire, Jul. 23, 2001, pp. 1-5 (downloaded from: web.archive.org/wweb/20010723054055/http://www.digit-life.com/articles/mobilet9/).

James, Christina, et al., "Bringing Text Input Beyond the Desktop", CHI 2000, Seattle, WA, Apr. 1-6, 2000, pp. 49-50.

Kushler, Cliff, "AAC Using a Reduced Keyboard", downloaded from: www.dinf.ne.jp/doc/english/Us_Eu/conf/csun_98/csun98_140.htm, Web Posted Mar. 3, 1998, pp. 1-4.

Sugimoto, Masakatsu, "Single-Hand Input Scheme for English and Japanese Text", Fujitsu Sci. Tech.J., vol. 33 No. 2, Dec. 1997, pp. 189-195.

http://www.pinyin.info/readings/texts/ideographic_myth.html. *The Ideographic Myth*. 1984.

http://www.ling.upenn.edu/courses/Fall_2003/ling001/reading_writing.html. What is writing? Linguistics 001. Lecture 19. Reading and Writing 2003.

http://www.zicorp.com/ezitap.htm, 2005.

http://www.tapless.biz/, Copyright 2003-2005.

http://www.wordloqic.com/products-predictive-kevboard-handheld-prediction.asp, Oct. 30, 2005.

http://pitecan.com/OpenPOBox/info/index.html, Sep. 1999.

http://www.nuance.com/, Feb. 7, 2006.

Suhm B., et al. "Multimodal Error Correction for Speech User Interfaces" ACM Transactions on Computer-Human Interaction, vol. 8. Mar. 2001.

Oviatt,S. "Mutual Disambiguation of Recognition Errors in a Multimodal Architecture." Chi 99. May 15-29, 1999.

Foulds, R., et al. "Lexical Prediction Techniques Applied to Reduce Motor Requirements for Augmentative Communication," RESNA 10th Annual Conference, San Jose, California, 1987, pp. 115-117.

Foulds, R., et al., "Statistical Disambiguation of Multi-Character Keys Applied to Reduce Motor Requirements for Augmentative and Alternative Communication," AAC Augmentative and Alternative Communication (1987), pp. 192-195.

IMB Technical Disclosure Bulletin, "Speed Keyboard for Data Processor," vol. 23, 3 pages, Jul. 1980. IBM Corp., 1993.

Kamphuis, H., et al., "Katdas; A Small Nunber of Keys Direct Access System," RESNA 12th Annual Conference, New Orleans, Louisiana, 1989, pp. 278-279.

King, M.T., "JustType-Efficient Communication with Eight Keys," Proceedings of the RESNA '95 Annual Conference, Vancouver, BC, Canada, 1995, 3 pages.

Kreifeldt, J.G., et al., "Reduced Keyboard Designs Using Disambiguation," Proceedings of the Human Factors Society 33rd Annual Meeting, 1989, pp. 441-444.

Levine, S.H., "An Adaptive Approach to Optimal Keyboard Design for Nonvocal Communication," IEEE, 1985, pp. 334-337.

Levine, S.H., et al., "Adaptive Technique for Customized Interface Design With Application to Nonvocal Communication," RESNA 9th Annual Conference, Minneapolis, Minnesota, 1986, pp. 399-401.

Levine, S.H., et al., "Computer Disambiguation of Multi-Character Key Text Entry: An Adaptive Design Approach," IEEE, 1986, pp. 298-301.

Matias, E.; et al., "Half-QWERTY: Typing With One Hand Using Your Two-Handed Skills," Conference Companion, CHI '94 (Apr. 24-28, 1994), pp. 51-52.

Minneman, S.L., "A Simplified Touch-Tone Telecommunication Aid for Deaf and Hearing Impaired Individuals," RESNA 8th Annual Conference, Memphis Tennessee, pp. 209- 211, 1985.

Oommen, B.J., et al., "Correction to 'An Adaptive Learning Solution to the Keyboard Optimization Problem'." IEEE Transactions on Systems, Man and Cybernetics, vol. 22, No. 5 (Oct. 1992) pp. 1233-1243.

Smith, Sidney L., et al, "Alphabetic Data Entry Via the Touch-Tone Pad: A Comment," Human Factors, 13(2), Apr. 1971, pp. 189-190.

Sugimoto, M., et al., "SHK: Single Hand Key Card for Mobile Devices," CHI 1996 (Apr. 13-18, 1996), pp. 7-8.

Swiffin, A.L., et al., "Adaptive and Predictive Techniques in a Communications Prosthesis," AAC Augmentative and Alternative Communication, (1987), pp. 181-191.

Swiff in, A.L., et al., "PAL: An Effort Efficient Portable Communication Aid and Keyboard Emulator," RESNA 8th Annual Conference, Memphis, Tennessee, 1985, pp. 197, 199.

Witten, I.H., Principles of Computer Speech, New York: Academic Press, (1982), pp. 246-253.

Oommen, B. John, et al.; "String Taxonomy Using Learning Automata"; Apr. 1997; IEEE Transactions on Systems, Mand and Cybernetics—Part B: Cybernetics, vol. 27 No. 20 pp. 354-365.

Lesher, Gregory W. et al.; "Optimal Character Arrangements for Ambiguous Keyboards"; Dec. 1998; IEEE Transactions on Rehabilitation Engineering, vol. 6, No. 4, pp. 415-423.

Rosa, J. "Next Word Prediction in a Connectional Distributed Representation System"; 2002 IEEEE Intnl Conference on Systems, man and Cybernetics; Conf. Proceedings (Cat. No. 02CH37349) Part vol. 3, p. 6, Yasmine Hammamet, Tunisia, Oct. 2002.

Rosa, J., "A Biologically Motivated Connectionist System for Predicting the Next Word in Natural Language Sentences", 2002 IEEE IntnI Conference on Systems, man and Cybernetics; Conf. Proceedings (Cat. No. 02CH37349) Part vol. 4, p. 6, Yasmine Hammamet, Tunisia, Oct. 2002.

Kronlid, F., Nilsson, V. "TreePredict, Improving Text Entry on PDA's"; Mar. 31-Apr. 5, 2001; Proceedings of the Conference on Human Factors in Computing Systems (CHI2001), ACM press; 2 pages, unnumbered on original document.

Zernik, U., "Language Acquisition: Coping with Lexical Gaps", Aug. 22-27, 1998; Proceedings of the 12th International Conference on Computational Linguistics, Budapest, Hungary. pp. 796-800.

Gavalda, M. "Epiphenomenal Grammar Acquisition with GSG"; May 2000; Proceedings of the Workshop on Conversational Systems of the 6th Conf. on Applied Natural Language Processing and the 1st Conf. of the N. American Chapter of the Assoc. for Computational Linguistics (ANLP/NAACL-2000), Seattle, Washington; 6 pages, unnumbered on original document.

Cockburn, A., Siresena, "Evaluating Mobile Text Entry with Fastap™ Keypad"; Sep. 2003; People and Computers XVII (vol. 2): British Computer Society Conference on Human Computer Interaction. Bath, England; 12 pages, unnumbered on original document.

Butts, L., Cockburn, A., "An Evaluation of Mobile Phone Text Input Methods", Jan.-Feb. 2002; University of Canterbury, Dept of Computer Science, Christchurch, New Zealand AUIC2002, Melbourne Australia, Conferences in Research and Practice in Information Technology, vol. 7; Copyright 2001, Australian Computer Society; 5 pages, unnumbered on original document.

Shieber, S., Baker, E., "Abbreviated Text Input"; Jan. 12-14, 2003; Harvard University, Cambridge, MA, USA shieber@deas.harvard. edu ellie@eecs.harvard.edu; IUI'03, ACM 1-58113-586-6/03/0001; pp. 293-296.

Masui, "POBox: An efficient Text Input Method for Handheld and Ubiquitous Computers"; Sep. 1999; in Proc. of the International Symposium on Handheld and Ubiquitous Computing (HUC '99); 12 pages, unnumbered on original document.

Yang, Y., Pedersen, J., "A Comparative Study on Feature Selection in Text Categorization"; Jul. 1997; Proceedings of ICML '97; 9 pages, unnumbered on original document.

* cited by examiner

CONTEXTUAL PREDICTION OF USER WORDS AND USER ACTIONS

CROSS REFERENCE TO RELATED APPLICATIONS

This application is a continuation-in-part of the following application, and claims the benefit thereof in accordance with 35 USC 120: U.S. application Ser. No. 10/176,933, filed Jun. 20, 2002, entitled "Explicit Character Filtering of Ambiguous Text Entry." The '933 application was a continuation-in-part of U.S. application Ser. No. 09/454,406, filed on Dec. 31, 1999. The '933 application also claimed the benefit under 35 USC 119 of U.S. Provisional Application No. 60/110,890 which was filed on Dec. 4, 1998. The present application also claims the benefit under 35 USC 119 of U.S. Provisional Application No. 60/504,240, which was filed on Sep. 19, 2003. The entirety of the foregoing applications is hereby incorporated herein by reference.

BACKGROUND OF THE INVENTION

1. Technical Field

The invention relates to user entry of information into a system with an input device.

More particularly, the invention relates to contextual prediction of intended user inputs and actions.

2. Description of the Prior Art

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user. Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. Also, there are memory constraints. Recognition software often needs more memory than is available on the device. This is especially true with such devices as mobile telephones.

Presently, a tremendous growth in the wireless industry has spawned reliable, convenient, and very popular mobile communications devices available to the average consumer, such as cell phones, two-way pagers, PDAs, etc. These handheld wireless communications and computing devices requiring text input are becoming smaller still. Recent advances in two-way paging, cellular telephones, and other portable wireless technologies have led to a demand for small and portable two-way messaging systems, and especially for systems which can both send and receive electronic mail ("e-mail").

Some wireless communications device manufacturers also desire to provide to consumers devices with which the consumer can operate with the same hand that is holding the device.

Disambiguation Background

Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys, since each keystroke may indicate one of several letters. Several approaches have been suggested for resolving the ambiguity of the keystroke sequence, referred to as disambiguation.

One suggested approach for unambiguously specifying characters entered on a reduced keyboard requires the user to enter, on average, two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the artide "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context.

Another suggested approach based on word-level disambiguation is disclosed in a textbook entitled Principles of Computer Speech, authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

H. A. Gutowitz, Touch-Typable Devices Based on Ambiguous Codes and Methods to Design Such Devices, WO 00/35091 (Jun. 15, 2000) discloses that the design of typable devices, and, in particular, touch-type devices embodying ambiguous codes presents numerous ergonomical problems and proposes some solutions for such problems. Gutowitz teaches methods for the selection of ambiguous codes from the classes of strongly-touch-typable ambiguous codes and substantially optimal ambiguous codes for touch-typable devices such as computers, PDA's, and the like, and other information appliances, given design constraints, such as the size, shape and computational capacity of the device, the typical uses of the device, and conventional constraints such as alphabetic ordering or Qwerty ordering.

Eatoni Ergonomics Inc. provides a system called WordWise, (Copyright 2001 Eatoni Ergonomics Inc.), adapted from a regular keyboard, and where a capital letter is typed on a regular keyboard, and an auxiliary key, such as the shift key, is held down while the key with the intended letter is pressed. The key idea behind WordWise is to choose one letter from each of the groups of letters on each of the keys on the telephone keypad. Such chosen letters are typed by holding down an auxiliary key while pressing the key with the intended letter. WordWise does not use a vocabulary database/dictionary to search for words to resolve ambiguous, unambiguous, or a combination thereof entries.

Zi Corporation advertises a next word prediction, eZiText [R] (2002 Zi Corporation), but to our knowledge does not anywhere suggest the presentation of multiple predictions, or the reorder of selection lists to give precedence to words matching context.

Other next word production systems that are known include iTAP, which is offered by Motorola's Lexicus division (http://www.motorola.com/lexicus/), and the adaptive recognition technology offered by AIRTX (http://www.airtx.com/).

Disambiguating an ambiguous keystroke sequence continues to be a challenging problem. For example, known approaches to disambiguation focus primarily upon completion of a partially entered sequence, and not upon predicting an as yet unentered sequence. Further, the user context is not typically taken into account when disambiguating an entered sequence, nor does the disambiguation of an entered sequence result in the taking of an action on behalf of a user, but rather merely focuses on the completion and display to a user of an intended sequence.

It would be advantageous to provide an approach to processing user inputs that results in predicting an as yet unentered sequence. Further, it would be advantageous to provide an approach in which the user context is taken into account when disambiguating an entered sequence. Additionally, it would be advantageous to provide an approach in which the disambiguation of an entered sequence results in the taking of an action on behalf of a user.

SUMMARY OF THE INVENTION

The invention concerns user entry of information into a system with an input device. A scheme is provided in which an entire word that a user wants to enter is predicted after the user enters a specific symbol, such as a space character. If the user presses an ambiguous key thereafter, rather than accept the prediction, the selection list is reordered. For example, a user enters the phrase "Lets run to school. Better yet, lets drive to "."" After the user presses the space, after first entering the second occurrence of the word "to," the system predicts that the user is going to enter the word "school" based on the context in which the user has entered that word in the past. Other predictions may be available if the user had previously entered text with the same context (for example, "to work", "to camp"). These predictions are presented if the user presses the "next" key; the key specified for scrolling through the list. Should the user enter an ambiguous key after the space, then a word list is reordered to give precedence to the words that match context. For example, if the user presses the ambiguous key that contains the letters 'a', 'b', and 'c', the word "camp" is given precedence in the list.

The invention can also make predictions on other forms of context, such as the person to whom the message is sent, the person writing the message, the day of the week, the time of the week, etc.

Other embodiments of the invention contemplate anticipation of user actions, as well as words, such as a user action in connection with menu items, or a user action in connection with form filling.

User actions or inputs can affect the automatic changing of the device's state based on context. For example, the system might use context to change a mobile telephone from 'ring' to 'vibrate', during the time that the calendar shows that the user is in a meeting. Another embodiment uses location context to increase the mobile telephone volume when the user is outside or when the telephone detects high levels of background noise.

In another embodiment, the system learns the user habits. For example, based on the learned user action, the system is able to offer services to the user that the user may not be aware of.

In another embodiment, word prediction is based on the previous word context (bigram context), but might also use the previous 'n' words (trigram context, etc).

DETAILED DESCRIPTION OF THE INVENTION

The invention concerns user entry of information into a system with an input device. A scheme is provided in which an entire word that a user wants to enter is predicted after the user enters a specific symbol, such as a space character. If the user presses an ambiguous key thereafter, rather than accept the prediction, the selection list is reordered. For example, a user enters the phrase "Lets run to school. Better yet, lets drive to "."" After the user presses the space, after first entering the second occurrence of the word "to," the system predicts that the user is going to enter the word "school" based on the context in which the user has entered that word in the past. Other predictions may be available if the user had previously entered text with the same context (for example, "to work", "to camp"). These predictions are presented if the user presses the "next". key; the key specified for scrolling through the list. Should the user enter an ambiguous key after the space, then a word list is reordered to give precedence to the words that match context. For example, if the user presses the ambiguous key that contains the letters 'a', 'b', and 'c', the word "camp" is given precedence in the list.

The invention can also make predictions on other forms of context, such as the person to whom the message is sent, the person writing the message, the day of the week, the time of the week, etc.

In another embodiment of the invention, rather than explicitly define the context parameters, such as sender/recipient/email/SMS/reply/forward/new email etc, the system is passed a series of parameters by the device which may or may not be relevant and the system learns which of the parameters are relevant for prediction and which ones are not.

In other embodiments of the invention, prediction may go beyond words and predict phrases. Prediction also may depend on grammar, semantics etc.

Other embodiments of the invention contemplate anticipation of user actions, as well as words and phrases, such as a user action in connection with menu items, or a user action in connection with form filling.

In further embodiments, the knowledge gained from user patterns can be uploaded/downloaded and/or served from a server allowing this information to be shared between devices and applications.

Discussion

For purposes of the discussion herein, with regard to the contextual completion of words, the term 'Next Word Prediction' (NWP) means, inter alia:
1) Predicting, after entering a space character, the entire next word that the user wants to enter, and
2) If the user presses an ambiguous key, rather than accept the prediction, the selection lists are reordered.

Figure 1:
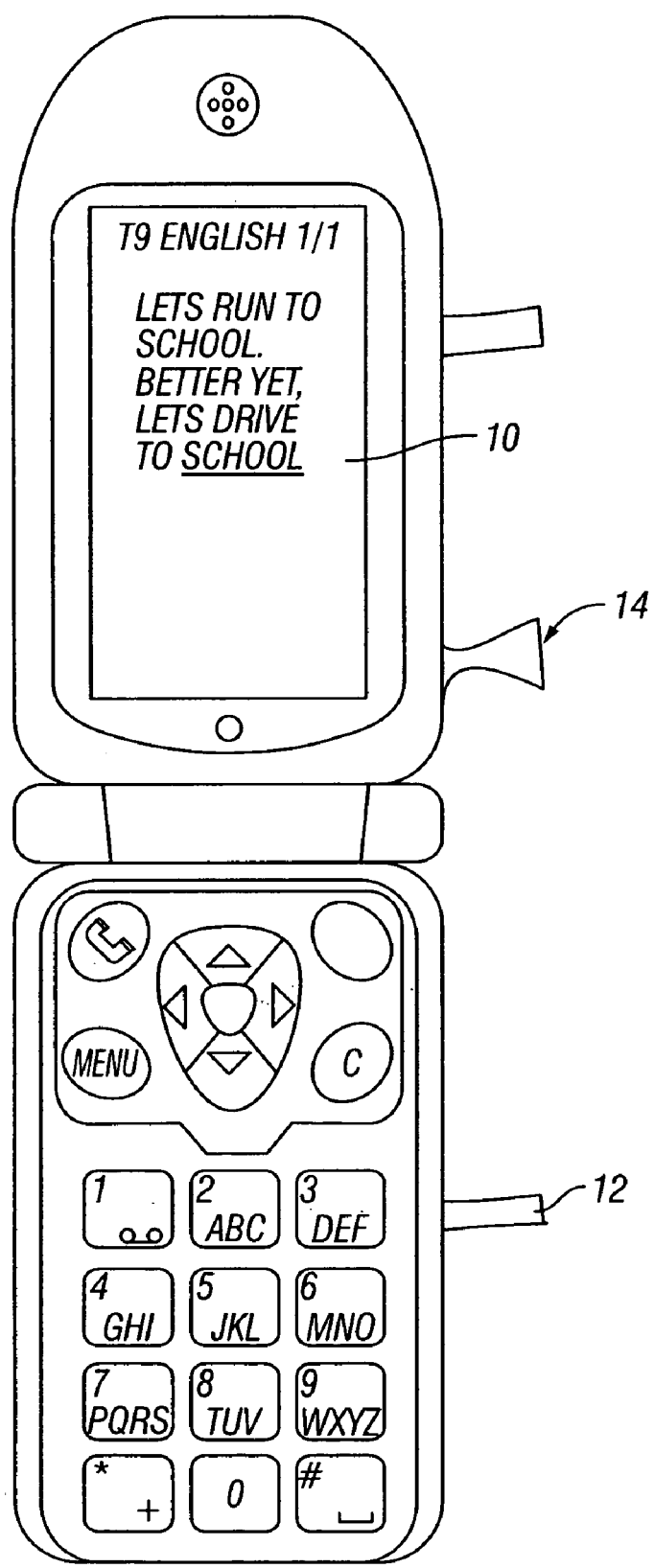
FIG. 1 is a schematic representation of a device having a display and user information input mechanism, and that incorporates next word prediction technology according to the invention.

FIG. 1 is a schematic representation of a device 14 having a display 10 and user information input mechanism 12, and that incorporates next word prediction technology according to the invention. In FIG. 1, the user has entered the phrase "Lets run to school. Better yet, lets drive to." The user presses space after entering the word "to," and the system predicts that the user is next going to enter the word "school," based on the context in which the user has entered the word "school" in the past. In this case, only the previous word for the context is looked at. The last time the user entered the word "to," he entered the word "school" directly after. In the example of FIG. 1, the user has entered the word "to" again, and the prediction word "school" is present. If in the past the user had entered other words after the word "to," those additional predictions are provided, as well, in a list, for example. In this example, context information comes from previous text entered in this message only. In a preferred embodiment, context information is compiled from text entered in prior messages/sessions as well.

Predictions are made when the context in the current message matches the context in text the user previously entered. The concept of context can be very general. Context can mean the nature of the text entered. Context can also be combined with other contexts, such as, for example:
a) The person to whom a message is sent;
b) The person writing the message;
c) The day of the week;
d) The time of day.

Finally, the prediction system might not know what the most important factors are for context, e.g. are they:
Text and message recipient?;
Text and message writer?;
All three?.

A further embodiment starts with a very broad set of possible factors and performs on-the-fly factor analysis of the user behavior to determine the most effective factor to include as context. This system does more than adapt to user behavior based on a priori specified factors, such as text, recipient, author, day, that are recorded, but is also intelligent enough to determine which factors are most important and emphasize those. This allows for better prediction.

Another example of prediction contemplated by the invention is based upon time of day. For example, when entering a message "let's meet for" at lunchtime, the word "lunch" is automatically predicted as the next word in the phrase. Later in the day the word "dinner" is predicted. The phrases stored also can have time of day associated with them as one of their attributes. This can be used to decide which phrases are relevant when the user is entering text.

Prediction of User Actions

Prediction can also be applied to other concepts as well, such as menus and user actions. When a user clicks a menu, the context module is provided with a keyword for that menu as the preceding context word. The context module then produces the entries previously selected from that menu because they are in the context database as entries preceded by that keyword, and those words can be re-ordered to the top of the menu. When a menu entry is selected, the context module then automatically notes it as having occurred with the menu tag as context for re-ordering to the front next time.

For example, when the user clicks the "Edit" menu, the context module is provided "Edit:" as context. If the last time a user clicked "Edit" the user chose "Find," then "Find" is shown at the front of the menu. If the user moves past that to "Replace," then a use of "Replace" in the context of "Edit:" is marked, so that the next time the user selects the "Edit" menu, "Replace" becomes the first entry, followed by "Find" and the other less-frequently used entries.

Note that for cell phones with limited screen space, moving commonly used entries to the front of a menu can make them immediately visible when they otherwise are not visible without scrolling.

In one embodiment, learning is used, in simple case context and reorder, to predict the next macro-level user interface (UI) behavior the user is expected to perform. Instead of reordering menus based on past usage, the normal menu format is superceded entirely by reordering immediate options for the next state/application the user is expected to go to, and the most likely option can be performed automatically, if desired.

For example, consider the situation where the system knows that whenever a user is n the settings mode on the phone, and they are choosing an input method or language, they are very likely to move next to their favorite messaging application. Then, instead of presenting the user with the normal menu tree to get to the messaging application, the system:
a) Goes there automatically, or if that is found to not be feasible;
b) Presents that as a visible prominent option right there in the settings window, along with the next most likely option.

The last option would be "go to standard menu tree." This way, the user is presented with the most likely next end state, rather than the most likely behavior directly from here, which in a normal phone would be going back to the menu tree. The user does not have to navigate a menu tree at all, but rather has one click (or no click) to go to the next task.

Additional embodiments of the invention apply to contexts that, for example pose any of the following questions:
What end state is the user most likely to be in immediately after a messaging application?
What end state is the user most likely to be in after entering something into a phonebook?
What end state is the user most likely to be given the last two places he was?
Given the time of day?
Should a factor analysis be performed on the fly to isolate the most relevant factor's involved in deciding what the next move should be?

Forms

Form filling is another useful function performed by the invention. Context sensitivity by field attribute, e.g. date only predicts months, day switches to numeric mode etc. This can similarly be applied to form input. The browser, or other form-input software, can provide the prompt for the input cell as context for text entry of the cell. Thus, for example, when a form prompts for "Name:" the user's name is available with few to no keystrokes, and other names he might fill in on forms are also made easier to enter.

Implementation of Contextual Word Prediction in Tegic T9 Technology

The herein disclosed next word prediction invention has been applied to Tegic Corporation's T9 technology (see www.tegic.com and www.t9.com). T9 technology combines the groups of letters found on each key of an input device, e.g. each phone key, with a fast-access dictionary of words, and recognizes what a user wants to input as text as he types. T9 offers the most commonly-used word for every key sequence entered by default and then lets the user access other choices with one or more presses of the NEXT or space key.

Figure 2:
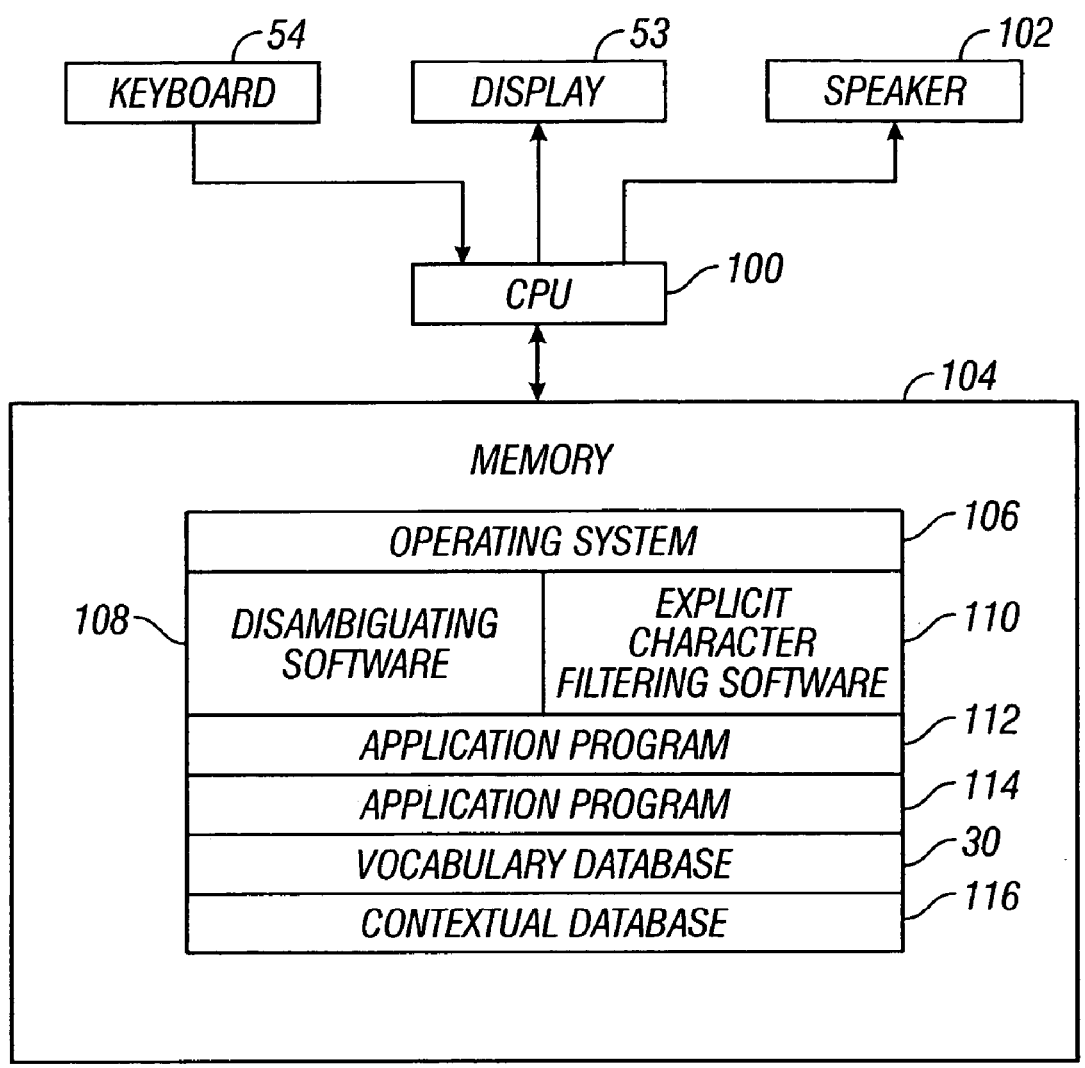
FIG. 2 is a block diagram of a preferred embodiment of a reduced keyboard disambiguating system for a T9 implementation of the invention.

A block diagram of a preferred embodiment of a reduced keyboard disambiguating system hardware for a T9 implementation of the invention is provided in FIG. 2. The keyboard 54 and the display 53 are coupled to a processor 100 through appropriate interfacing circuitry. Optionally, a speaker 102 is also coupled to the processor. In this embodiment, the processor 100 receives inputs from the keyboard, and manages all output to the display and speaker. The processor 100 is coupled to a memory 104. The memory includes a combination of temporary storage media, such as random access memory (RAM), and permanent storage media, such as read-only memory (ROM), floppy disks, hard disks, or CD-ROMs. The preferred memory 104 contains all software routines necessary to govern system operation. Preferably, the memory contains an operating system 106, disambiguating software 108, associated filtering of ambiguous text entry software and/or extending and interpreting software 110, and a contextual database 116, the latter of which is discussed in additional detail below. The memory also includes a vocabulary database 30. Optionally, the memory may contain one or more application programs 112, 114. Examples of application programs include word processors, software dictionaries, and foreign language translators. Speech synthesis software may also be provided as an application program, thereby allowing the reduced keyboard disambiguating system to function as a communication aid. Therefore, the output, in this case, might be vocally output from the speaker.

It should be appreciated and understood by one of ordinary skill in the art that the discussion herein applies to symbols and sequences of symbols, which, when combined, make an object or part of an object. A typical example of a symbol is a character in any language, such as a letter, digit, punctuation mark, or any other symbol from a language. A typical example of an object or part of an object is a word or part of a word. However, the discussion herein equally applies to Japanese kana and Korean jamos. Also, it should be noted that the objects do not have to be linguistic, as the claimed disambiguating system herein can be used to predict icons, phone numbers, or inventory records, as long as a type of symbolic string representation is present. Therefore, it should be appreciated that use of the terms such as letter, word, word stem, and the like are not limited to only those applications, and are used to facilitate ease of reading and understanding the discussion herein.

For purposes of the discussion herein, T9 systems comprise at least three components:

An integration layer. This component contains the user interface (UI) and handles communications between the device and the T9 core. Communications can occur either through an event-based or a function-based API, discussed below.

A core engine, for example the core engine known as the T9 core, which is provided by Tegic.

One or more language databases (LDBs). Each LDB contains information on a particular language. T9 uses this information to generate lists of words for that language. LDBs can include, for example, any of Alphabetic T9 LDBs, Chinese T9 LDBs, and Korean T9 LDBs.

Supplemental Databases

Alphabetic T9 and Chinese T9 implementations can include the following supplemental databases:

User Database (Alphabetic T9). An Alphabetic T9 UDB contains custom words entered by the user. Typically, these are words that cannot be generated by the LDB, such as names, e-mail addresses, and instant messaging IDs. The database also contains information on how frequently a user selects words—both custom words and words from the LDB.

Context Database (Alphabetic T9). An Alphabetic T9 CDB contains information on the words the user has previously entered. T9 requires this information for its next-word prediction and CDB word completion features. The context database contains recently entered words. Alphabetic T9 uses this information to provide predicted and completed words in the selection list, and to reorder full and completed words in the selection list.

Manufacturer Database (Alphabetic T9). An Alphabetic T9 MDB contains words one wants to make available to T9 users but which typically cannot be generated by the LDB. MDB entries can include geographic locations, stock ticker symbols, and URLs.

Chinese User Database (Chinese T9). A Chinese T9 CUDB contains user-entered character phrases, i.e. strings of Chinese characters that together form a phrase.

Chinese Automatically Reordering User Database (Chinese T9). A Chinese T9 CAUDB contains recently entered characters from a Chinese T9 LDB.

Generating Selection-List Words

When the user enters an active key sequence, Alphabetic T9 checks its databases (LDB, UDB, CDB, and MDB) for words that match the key sequence.

The Alphabetic T9 selection list is designed to provide the words a user most likely desires, based on 1) how frequently the user enters the word, 2) how common the word is in the language and 3) the previous context in which the keys were entered, so that the words appear at the beginning of the selection list.

The relative order of selection-list items depends on which databases are enabled and which features, such as selection list reordering and word completion and word prediction, are enabled.

The first word in Alphabetic T9's selection list is active by default. The term active word refers to the currently active selection-list word.

An example of the selection list order is given below. It is assumed that keys have been entered and no T9 database or database features are disabled.

1) CDB words of length of key sequence.
2) Reordered (highly used) LDB and Custom user words of length of key sequence.
3) Top LDB words of length of key sequence.
4) Less commonly used Custom words of length of key sequence.
5) Less commonly used Manufacturer (MDB) words of length of key sequence.
6) Remaining LDB words of length of key sequence.
7) CDB words that are longer than entered key sequence (these are completed by T9).

8) Custom and manufacturer words that are longer than entered key sequence (these are completed by T9).
9) Words that are result of multiple database lookups. These are attempts to match URLs and other long sequences.

Processing an Accepted Word

When the user accepts the active word by moving the cursor off the word (pressing keys that correspond to the T9 key values T9KEYRIGHT, or T9KEYLEFT) Alphabetic T9: Adjusts the word's selection frequency value if it is in the UDB as a custom word.

Adjusts the word's selection frequency value if it is in the LDB and Alphabetic T9's selection list reordering feature has not been disabled.

When the user accepts the active word by entering a space (pressing keys that correspond to the T9 key value T9KEYSPACE) Alphabetic T9 performs the actions above, as well as the following actions:

Adds to the UDB as a custom word all the characters between the newly entered space and the one before it, if the UDB and LDB do not already contain the word.

Adds to the CDB all the characters between the newly entered space and the one before it.

Predicting the Next Word

Figure 3:
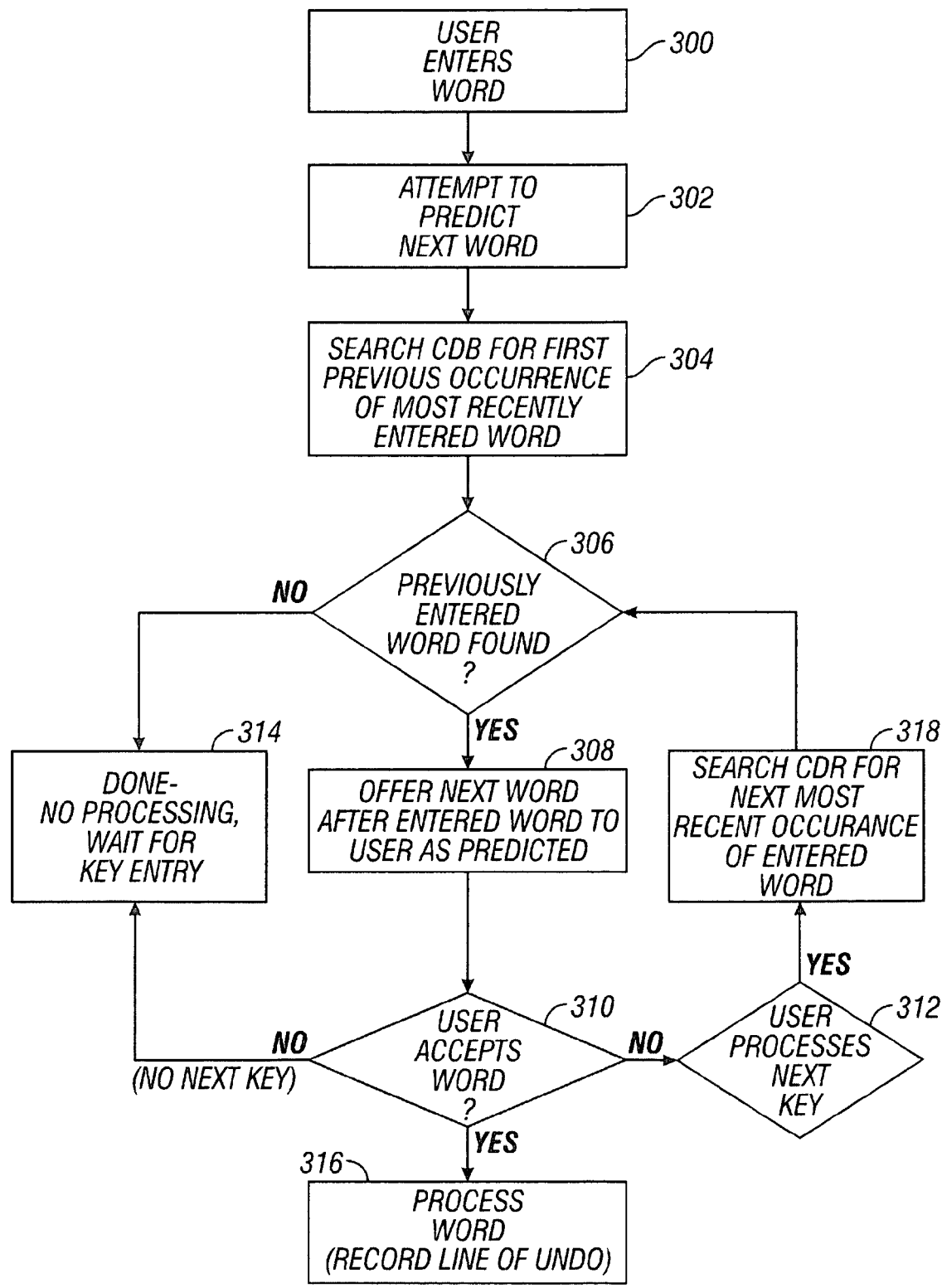
FIG. 3 is a flow diagram showing a next word prediction method according to the invention.

FIG. 3 is a flow diagram showing a next word prediction method according to the invention. As text is entered, the words are stored in the CDB in the order in which they were entered by the user. When the user enters a word (300), Alphabetic T9 attempts to predict the next word desired (302) if the implementation includes a CDB. Alphabetic T9 searches the CDB (304) for the first previous occurrence of the most recently entered word. If Alphabetic T9 finds the word (306), whatever word appears after it in the database is offered to the user as a predicted word (308). If the word is not found (306), processing is complete and T9 waits for next key entry (314). If the predicted word is accepted by the user (310) the word is processed; T9 records use of word (316). If the user does not accept the word (310), but presses the 'next' key (312), the CDB is searched for the next most recent occurrence of the word just entered (318). If found, the word following it in the database is presented as a prediction (306 and 308). If the user does not accept the word (310), and does not press the next key, no processing is complete, and T9 waits for next key entry (314), as further described in connection with FIG. 4.

Alphabetic T9 creates a selection list of predicted words. The maximum number of predicted words in the selection list depends on the literal value of the #define constant T9MAXCDBMATCHES. Unless a different value is assigned, this constant is set to 6.

The user selects and accepts a predicted word using the same process used in T9 for selecting and accepting a word. After the user accepts a predicted word (310), Alphabetic T9 processes the word (312). It will be appreciated by those skilled in the art that the invention may be applied to other disambiguation systems than T9, as well as other forms of T9 than Alphabetic T9.

Processing Words

Figure 4:
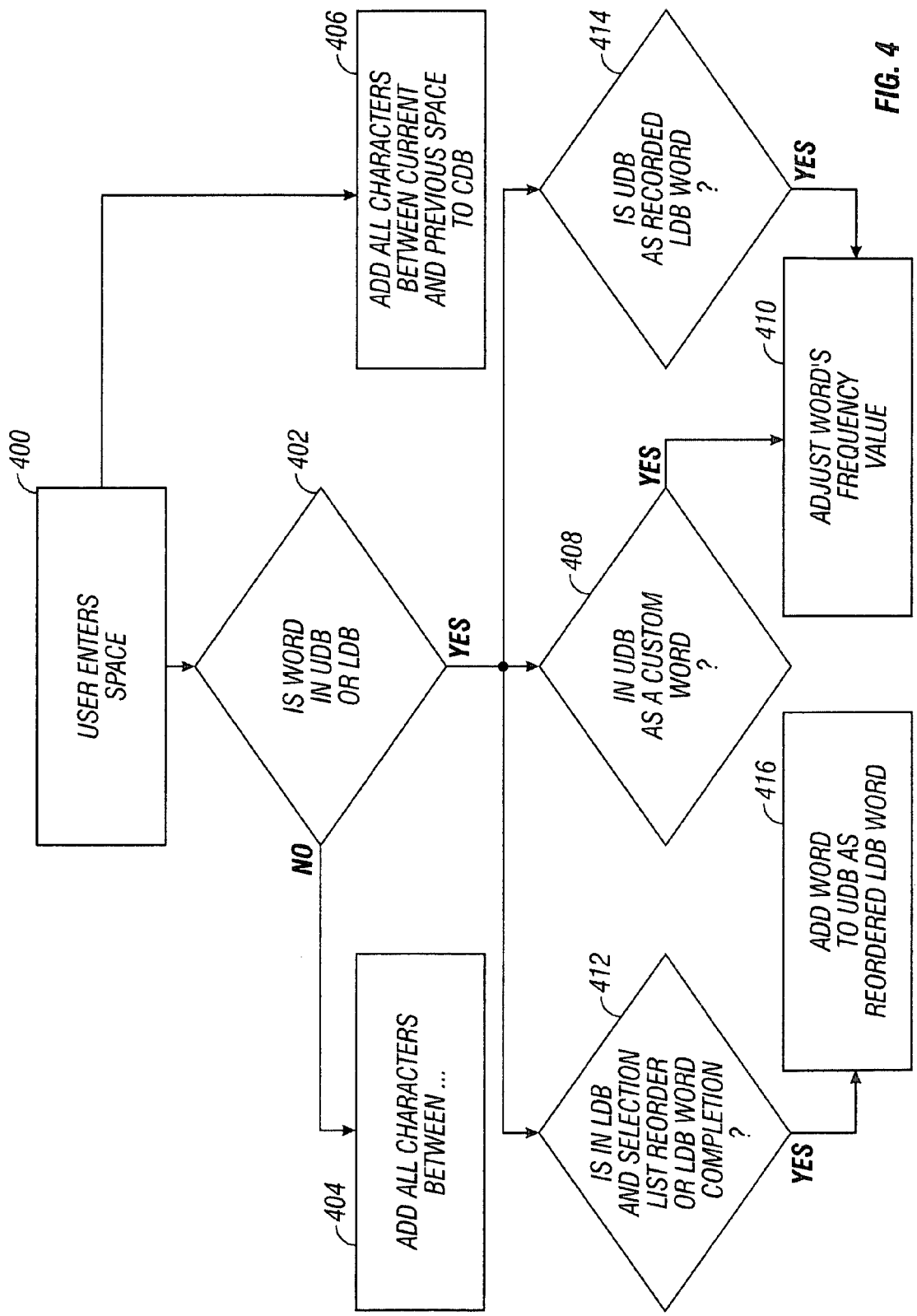
FIG. 4 is a flow diagram showing the processing of words in a next word prediction method according to the invention.

FIG. 4 is a flow diagram showing the processing of words in a next word prediction method according to the invention. When the user presses the Space key (400), to indicate the start of a new word, Alphabetic T9:

Adds to the UDB as a custom word (404) all the characters between the newly entered space and the one before it, if the UDB and LDB do not already contain the word (402).

Adds to the CDB all the characters between the newly entered space and the one before it (406).

Adjusts the word's selection frequency value (410) if it is in the UDB as a custom word (408).

Adjusts the word's selection frequency value (410) if it is in the UDB as a LDB reordered word (414).

Adds the word to UDB as LDB reordered word (416) if it is in the LDB and Alphabetic T9's selection list reordering or LDB word completion features have not been disabled (412).

Alphabetic T9 Context Database

The following discussion describes how to implement and operate an Alphabetic T9 Context Database (CDB). A CDB contains information on recently entered words. Alphabetic T9 uses this information to include predicted and completed words in the selection list. Whereas Alphabetic T9 checks its other databases only for words that match the current active key sequence, Alphabetic T9 also checks the CDB for the most recently accepted word, i.e. the most recently entered non-active word. CDB words do not necessarily have to match the active word to be included in the selection list. For predicted words, which appear in the preferred embodiment only when there is no active key sequence, the CDB match depends on the word before the active word. For completed CDB words, the match depends on both the word before the active word and the key sequence of the active word.

If Alphabetic T9 finds in the CDB the word the user has entered, Alphabetic T9 suggests the word that immediately follows in the CDB as a predicted word. For example, if the CDB contains the word pair "text message" and the user enters the word "text" and then presses the Space key, Alphabetic T9 places "message" in the selection list as a predicted word.

Also, if Alphabetic T9 finds in the CDB the word the user has entered, Alphabetic T9 suggests the word that immediately follows in the CDB as a completed word if the word matches the active key sequence, although the completed word contains additional characters. For example, if the CDB contains the word pair "text message" and the user enters the word "text," adds a space, and then enters the key sequence 6-3-7-7, which corresponds to the first four letters in the word "message", Alphabetic T9 places "message" in the selection list as a completed word.

In the preferred embodiment, CDB word completion operates independently of UDB custom-word completion, LDB word completion, and MDB word completion.

Implementing a CDB

To implement an Alphabetic T9 CDB, the integration layer should:
1. Allocate persistent memory for the database.
2. Call T9AWCdbActivate to activate the CDB.
3. Indicate the CDB's size.
4. Reset the database, if desired.
5. Indicate that the integration layer writes data to the database, if necessary.
6. Disable next-word prediction, if desired.
7. Disable CDB word completion, if desired.
8. Handle requests submitted by T9.
9. Copy the database to persistent memory after T9 termination.

The implementation process described above assumes the CDB is stored in non-volatile memory and that CDB data are copied to RAM before activating CDB operations. If a different storage model is used, some of the steps above may not apply.

Allocating Persistent Memory

The integration layer must allocate persistent memory to store the CDB. When the integration layer activates CDB operations by calling T9AWCdbActivate, it copies the CDB from persistent memory to RAM. The database is referenced as an instance of the CDB Data Structure (T9AWCdbInfo).

Activating CDB Operations

If there is no existing CDB, e.g. the first time CDB operations are activated on the device, the integration layer must initialize all T9AWCdbInfo structure fields values to 0. If the integration layer has copied an existing CDB from persistent memory to RAM, it should not modify any T9AWCdbInfo structure field values.

The integration layer activates CDB operations by calling T9AWCdbActivate. When the integration layer calls this function, it provides a pointer to an instance of the C D B Data Structure (T9AWCdbInfo) for which it has allocated memory.

After the integration layer has activated enabled CDB operations, Alphabetic T9 automatically searches the CDB. The type of information Alphabetic T9 searches the CDB for depends on whether there is an active key sequence:
If there is an active key sequence, Alphabetic T9 searches the CDB for words that match the key sequence.
If there is no active key sequence, Alphabetic T9 searches the CDB for the most recently entered word. Alphabetic T9 requires this information for next-word prediction.

Indicating a CDB's Size

A CDB's size is indicated by the value of T9AWCdbInfo.wDataSize. The wDataSize field indicates the total size of T9AWCdbInfo. This includes the data area, where CD B data are stored, several related variables used by T9, and any structure-padding bytes added by the compiler environment.

If T9's Function API is used, it is not necessary to set the value of T9AWCdbInfo.wDataSize directly. Instead, the size of the CDB data area is provided as an argument to the function T9AWCdbActivate. While handling the function, T9 sets the value of T9AWCdbInfo.wDataSize.

One can make the CDB area as large wanted, but it must be at least T9MINCDBDATABYTES bytes. It is recommended, however, that the CDB be 1800*T9SYMBOLWIDTH bytes in size.

Resetting the CDB

When the integration layer activates CDB operations, Alphabetic T9 ensures the integrity of the database by:
Ensuring the CDB is the same size that T9 is expecting.
Verifying that the CUDB is at least T9CCUDBMINSIZE bytes in size and is an even number of bytes.
Verifying that the CDB uses the same character encoding as the LDBs.
If Alphabetic T9 detects a problem, it resets the CDB, which deletes all CDB data. This process occurs without any action by the integration layer, and Alphabetic T9 does not notify the integration layer that the CDB has been reset. The integration layer can explicitly reset the CDB by calling T9AWCdbReset. Under most circumstances, the integration layer does not need to call this function.

Indicating the Integration Layer Writes Data to the CDB

If the CDB is stored in a memory area that Alphabetic T9 cannot write to, the integration layer must write data to the database. Also, one may wish to have the integration layer write data to the CDB if it is desired to monitor what is written to the database or maintain a shadow copy of the CDB in non-volatile storage.

The integration layer informs Alphabetic T9 that it writes data by calling T9AWSetCdbWriteByOEM.

After the integration layer calls this event, Alphabetic T9 requests that the integration layer write data by calling T9REQCDBWRITE. If it is no longer necessary for the integration layer to write data to the CDB, the integration layer calls T9AWClrCdbWriteByOEM to indicate that Alphabetic T9 can write data directly.

Disabling Next-Word Prediction

When CDB operations are activated, T9 by default provides predicted words, i.e. words the user may want to enter, based on the words the user has already entered. Next-word prediction is available in both Ambiguous and Multitap text-entry modes.

Alphabetic T9 places predicted words in the selection list when the word the user has just entered is found in the CDB as the first part of one or more word pairs. Whatever word appears in the CDB after each instance of the word the user has just entered is provided as a predicted word.

It is possible to disable this functionality if one wants to use only CDB word completion, and not next-word prediction, in an Alphabetic T9 implementation. To disable CD B word completion, the integration layer calls T9AWClrCdbPrediction. To re-enable next-word prediction, the integration layer calls T9AWSetCdbPrediction.

Disabling CDB Word Completion

When CDB operations are activated, Alphabetic T9 by default places in the selection list completed CDB words that match the active sequence (and contain additional characters) if the word immediately before the active word is in the CDB immediately before the completed word(s). One can disable this functionality if one want to use only next-word prediction, and not CDB word completion, in an Alphabetic T9 implementation. To disable CDB word completion, the integration layer calls T9AWClrCdbCompletion. To re-enable CDB word completion, the integration layer calls T9AWSetCdbCompletion.

Note that CDB word completion operates independently of UDB custom word completion, LDB word completion, and MDB word completion. Many of the words in a CDB are also in other Alphabetic T9 databases. Alphabetic T9 suppresses these duplicates from the selection list. However, the potential effect of this duplication on other API events functions should be noted. For example, a UDB custom word that is deleted from the database still appears in the selection list if that word is also in the CDB. Likewise, if one were to disable LDB word completion, words in the LDB still appear in the selection list as completed words if they are also in the CDB and CD B word completion is enabled.

Handling T9 Requests

Depending on how the CDB is implemented, the integration layer may need to handle the following T9 request:
T9REQCDBWRITE—Requests that the integration layer write data to the CDB. T9 submits this request only if the integration layer informs T9 that it, and not T9, writes data to the CDB.

Copy an Updated CDB to Persistent Memory

The integration layer should copy the CDB data to persistent memory when it terminates Alphabetic T9 if the database has been modified during the T9 session. T9 increments the value of T9AWCdbInfo.wUpdateCounter whenever it modifies the database. The integration layer can determine whether the database has been modified by comparing the value of wUpdateCounter after the session to its value before the session. If the value is different, the integration layer must copy the updated CDB data to persistent memory. Note that it is likely that T9 modifies the CDB during every session.

Operating an Alphabetic T9 CDB

Alphabetic T9 CDB operations consist of the following tasks:

Adding data to a CDB.

Retrieving data from a CDB.

Deleting data from a CDB.

Adding Data to a CDB

Alphabetic T9 automatically adds data to the CDB. Note that if the CDB is stored in a memory area that T9 cannot write to, the integration layer must write data to the CDB.

Retrieving Data from a CDB

Alphabetic T9 automatically retrieves data from the CDB.

Deleting Data from a CDB

Alphabetic T9 does not permit users or the integration layer to delete words from the database. Instead, Alphabetic T9 automatically begins deleting the oldest words in the database when it is nearly full. This removal process is referred to as garbage collection, and it occurs without any action by the user or integration layer.

Operation

In the presently preferred embodiment of the invention, saved context data are used to return a prediction of the next word upon pressing the space, and to filter the word completions after entering key strokes. This, in principle, allows a user to reduce the number of keystrokes by quickly retrieving words that are correctly predicted based on the previous word or words. This completion feature is presently implemented by saving user entered text in a Context DataBase (CDB), and returning those words that match context and keystrokes.

NWP saves the recently entered user text and uses that text to predict the next word that the user enters. For example, if the user has typed the phrases 'hello Leslie,' hello Inger,' and 'Hello Helena' in the recent past, when the user types and accepts the word 'hello' by hitting space, the invention suggests:

Leslie
Inger
Helena as possible next words.

If the user does not accept one of these words, but rather continues typing, the invention uses context to prioritize completions presented to the user. In an embodiment employing a 12-key input device, if the above user types the 4 key after hitting space, the selection list presented to the user is:

i
h
g
4
Inger
Helena

If the above user types the 43 key after hitting space, selection list presented to the user is:

he
if
id
ie
ge
gf
Helena

After a space, the context database (CDB) objects make up the entire selection list. After pressing ambiguous keys, CDB objects appears as follows:

If CDB objects are of the length of the active key sequence, the objects appear at the top of the selection list.

If CDB objects are of a length greater that is than that of the active key sequence, the objects appear at the top of the completion portion of the list.

System state tracks completions after space with:

pFieldInfo->nWordLen=0;

pFieldInfo->nComplLen=length of context word.

After a user selects ambiguous keys, system state tracks CDB completions in the preexisting way:

pFieldInfo->nWordLen=length of active key sequence;

pFieldInfo->nComplLen=length of completion.

API

The T9 API consists of a global structure which holds word, wordlist, and buffer information that is used by the customer, and a set of events or functions for building, accepting, and deleting words, scrolling through word lists, and more. In alphabetic T9, the API structure is referred to as the T9AWFieldInfo structure (often referred to as pAWField-Info). The T9AWFieldInfo contains data that is specific to alphabetic T9. The T9AWFieldInfo structure contains another structure, T9FieldInfo (often referred to as pField-Info), which contains general word data that is also used in Japanese, Chinese, and Korean T9.

New API structure data and functions were added to T9 to implement NWP. The NWP feature is active if the host has allocated space for the context database and set the pField-Info->pCdbInfo to a non-zero value.

The following function API event is added to activate the CDB:

T9AWCdbActivate(T9AWFieldInfo *pAWFieldInfo, T9AWCdbInfo T9FARUDBPOINTER *pCdbInfo, T9UINT nDataSize, T9U8 bSymbolClass);

To set writing configuration:

T9EVTCDB:T9CTRLSETCDBWRITEBYOEM

Function API—T9AWSetCdbWriteByOEM (T9AWFieldInfo *pAWFieldInfo)

To clear writing configuration:

T9CTRLCLRCDBWRITEBYOEM

Function API—T9AWClrCdbWriteByOEM (T9AWFieldInfo *pAWField Info)

To reset the CDB:

T9EVTCDB:T9CTRLCDBRESET (Function API call: T9AWUdbReset(T9AWFieldInfo *pAWFieldInfo)

To break CDB context:

T9EVTCDB:T9CTRLCDBBREAKCONTEXT

Function API—T9AWBreakCdbContext (T9AWFieldInfo *pAWFieldInfo)

To fill context buffer:

T9EVTCDB: T9CTRLCDBFILLCONTEXTBUFFER buffer: pEvent->data.sCDBData.psBuf buffer length pEvent->data.sCDBData.nBufLen Function API—T9AWFillContextBuffer (T9AWFieldInfo *pAWFieldInfo, T9SYMB *psBuf, T9UINT nBufLen)

To get word prediction:

T9EVTCDB: T9CTRLCDBGETWORDPREDICTION

Function API—T9AWGetWordPrediction (T9AWFieldInfo *pAWFieldInfo)

To clear buffer but retain context:

T9EVTCLEARBUFFE

Function API—T9AWClearBuffer (T9AWFieldInfo *pAWFieldInfo)
To turn off CDB completion:
T9CTRLCLRCDBCOMPLETION
Function API—T9AWClrCdbCompletion (T9AWFieldInfo *pAWFieldInfo)
To turn on CDB completion:
T9CTRLSETCDBCOMPLETION
Function API—T9AWSetCdbCompletion (T9AWFieldInfo *pAWFieldInfo)
To turn off CDB completion:
T9CTRLCLRCDBPREDICTION
Function API—T9AWClrCdbPrediction (T9AWFieldInfo *pAWFieldInfo)
To turn on CDB completion:
T9CTRLSETCDBPREDICTION
Function API—T9AWSetCdbPrediction (T9AWFieldInfo *pAWFieldInfo)
The following request type is added:
T9REQCDBWRITE
This is used to request writes to CDB if external write is on.
There is no additional direct access to write to the CDB through the API.

Internal CDB Interfaces

Two interfaces to the CDB exist in the T9 embodiment of the invention:
AddCdbText(pFieldInfo, psWordBuf, nLen)

Where:
pfieldInfo=T9 fieldInfo
psWordBuf=buffer holding text
nLen=word length

And:
GetCdbObject(pFieldInfo, nUdbObjNum, nWordLen, nCursor, psBuildTxtBuf, nBuildTxtBufSize, pnComplLen, pnUdbObjCnt)

Where:
pfieldInfo=T9 fieldInfo
nUdbObjNum=CDB object number (1 for 1st match, 2 for second match, etc)
nWordLen=word length (o after space, 1 after 1 key, 2 after 2 keys, etc)
nCursor=cursor position
psBuildTxtBuf=pointer to build buffer
nBuildTxtBufSize=build buffer size
pnComplLen=pointer to completion length holder
pnUdbObjCnt=pointer to object count holder.

Functions
T9STATUS T9FARCALL T9AW_SaveAndAddToCdb (T9AWFieldInfo *pAWFieldInfo)
Adds Saves word to context buffer and add to context database. This function is called only after a space has been entered.
T9UINT T9FARCALL T9AW_GetCdbObject (T9AWFieldInfo *pAWFieldInfo, T9UINT nCdbObjNum, T9UINT nWordLen, T9UINT nCursor, T9U8 bObjectType, T9UINT *pnTerminal, T9U8 bRightMost, T9SYMB *psBuildTxtBuf, T9UINT nBuildTxtBufSize, T9UINT *pnComplLen, T9UINT *pnCdbObjCnt)
This function retrieves context matches from the CDB.
T9STATUS T9FARCALL T9AWCdbReset (T9AWFieldInfo *pAWFieldInfo)
This function resets the CDB.
T9STATUS T9FARCALL T9AWCdbActivate (T9AWFieldInfo *pAWFieldInfo, T9FARUDBPOINTER *pCdbInfo, T9U8 bSymbolClass)
This function activates the CDB.

Database

Present minimum database size requirements are 1800*symbol width (300 words*6 chars/word*symbolwidth bytes/char). This is 1800 for one-byte systems, and 3600 for two-byte systems.

The CDB saves recently entered text in the same form that the user enters it. The text is stored in a circular buffer. New words overwrite the least recent word in the CDB.

The CDB has global information in its header:
T9U16 wDataSize; /* Total size in bytes of this struct*/
T9U16 wUpdateCounter; /* Count incremented each time user database modified */
T9U16 wSymbolClass; /* T9 enum value indicating symbol table mapping for CDB */
T9U16 wDataBeginOffset; /* Offset to beginning of data */
T9U16 wDataEndOffset; /* Offset to end of data */
T9U16 wSavedOffset; /* pointer to last accessed position in database */
T9U32 dwOffsetSaver; /* identifier for thread that last saved offset. */
T9U8 bDataArea[1]; /* Really a variable size data array */

Reads

When requesting a word from the CDB, the system word builder passes a context buffer. Using the context buffer the CDB retrieves context matches in order of recency.

Writes

When the space key is hit, or white space is entered explicitly, the built word is written to the CDB. This happens in both ambiguous and multitap (MT) modes. The word also goes through its normal RUDB processing. There is no garbage cleanup in the CDB.

Context Buffer

A context buffer is maintained. The context buffer is updated on the pressing of space key and is cleared with any action that tends to lose context, such as cursoring and clearing. In a word API this is attached to the flushword function of a separate confirm function.

Functional Description

In the T9 embodiment, the NWP feature is active if:
a) the compile includes the code for this feature; and
b) the field info member pFieldInfo->pCdbInfo points to valid memory.

The functional elements that apply when the next word prediction feature is active in T9 are listed below:
FD100: T9 core saves in the CDB every recent word that was used. The number of words saved depends on the size allocated by the OEM to the CDB.
FD200: T9 ambiguous and MT modes return next word predictions after a space if there is an active word or the previous key hit is a T9 number key.
FD300: T9 ambiguous and MT modes return next word predictions after right arrow and space if there is an active word before the right arrow is pressed.
FD301: The result of FD300 and FD200 mean:
After cursoring off a word, and moving around the buffer, T9 does not present a prediction after space is hit.

"Cursoring around the buffer," means pressing either the left arrow or the right arrow, and ending with the cursor to the right of a word. The only exception is when the right arrow is hit to only flush (deactivate) a word.

T9 presents a prediction if a prediction is active and the user hits space to dear the prediction, hits clear again to clear the space, and then hits space again.

FD400: T9 always produces context matches when starting a word if that word is preceded by a space and another word. As an example, no prediction is delivered after cursoring around the buffer to the right of a word and hitting key space. However, if the user continues to type ambiguous number keys, context matches are delivered in the selection list.

FD500: CDB predictions/completions are retrieved in order of recency.

FD600: CDB is language independent.

FD700: After pressing space, the limit of the number of CDB matches is determined by the compile-time macro T9MAXCDBMATCHES. After the user presses number keys, there is no limit on the number of CDB matches delivered from the CDB to the builder.

FD800: No CDB predictions/completions are delivered across sentence punctuation. Sentence punctuation is defined as trailing punctuation on a non-emoticon. See FD1200 for definition of emoticon.

FD900: CDB predictions/completions are removed after pressing clear with a word active, but completions are delivered as the user begins typing again.

FD1000: There is no aging of the CDB; the least recent word is replaced by the most recent word entered.

FD1100: Context bigrams are recorded in the CDB on pressing space if there is an active word, or the previously hit key is a T9 number key. If the user cursors off a word, context is broken in the CDB.

FD1200: Candidates for context predictions are subject to the following processing:

If the word has no leading punctuation, trailing punctuation is stripped unless this looks like an emoticon. T9 assumes a word with trailing or leading punctuation is an emoticon if the word is more than one character and the number of non-alpha characters (punctuation and numbers) is at least one-half the total number of characters in the word. This is the same rule that is used for user database (UDB) processing.

If the word HAS leading punctuation, the word is rejected unless it appears to be an emoticon.

FD1300: If the user has pressed a number of T9 keys, context selection list items of the length of the key sequence are delivered at the beginning of the selection list. Context selection list items with completions are delivered at the top of the completion portion of the list, followed by MDB, UBD, and LDB in previously specified order.

FD1400: If caps-lock is on when space is hit, predicted words are entirely in upper case.

FD1500: The leading word is agnostic to case, but the trailing word is case sensitive. So if one types in "cab fee" and then turns on caps-lock and types in "CAB" and space, the system predicts "FEE." If one types in "cab fee," then types in "CAB" using shift rather than caps-lock, and then selects space, the system predicts "fee." Likewise, if one types in "Cab fee" and then types in "cab" and space, the system predicts "fee."

FD1600: Switches are available to turn on/off context predictions, and to turn on/off context completions.

Context Predictions and Completions in T9

Use Case:
1) User has recently entered the bigrams 'my money,' 'my time,' and 'my marriage' in order written here.
2) User enters and accepts the word 'my.'
3) Hit space.
4) Expect selection list:
   marriage
   time
   money
5) User enters 6 key.
6) Expect selection list:
   o
   m
   n
   6
   marriage
   money
7) User enters 6 key again.
8) Expect selection list:
   on
   no
   mm
   mo
   oo
   money Use Case:
1) User has recently entered the bigram 'bow tie'.
2) User enters and accepts the word 'bow.'
3) Hit space.
4) Expect selection list:
   tie
5) User enters 8 4 3 keys.
6) Expect selection list:
   tie
   the
   vie
   vid
   tid NOTE: Even though the word 'the' is the most common word in the English language, in this context, 'tie' is presented first in the list. It is the most likely candidate when preceeded by the word 'bow.'

Context Predictions and Completions in Multitap

Use Case:
1) User has recently entered the bigrams 'my money,' 'my time,' and 'my marriage' in order written here.
2) User enters the word 'my.'
3) Hit space.
4) Expect selection list:
   marriage
   time
   money
5) User enters an 'm.'
6) User presses next key.
7) Expect selection list:
   m
   marriage
   money
8) User enters 'o.'
9) User presses next key.

10) Expect selection list:
   mo
   money

Context Predictions and Completions in T9 (Flushing Before Space).

Use Case:
1) User and has recently entered the bigrams 'my money,' 'my time,' and 'my marriage' in order written here.
2) User enters the word 'my.'
3) Hit right arrow.
4) Hit space.
5) Expect No context predictions.
6) User enters 6 key.
7) Expect selection list:
   o
   m
   n
   6
   marriage
   money
8) User enters 6 key again.
7) Expect selection list:
   on
   no
   mm
   mo
   oo
   money Context Predictions and Completions with UDB Completions in T9
   CDB completions appear ahead of UDB completions.

Use Case:
1) User has recently entered the bigrams 'my money,' 'my time,' and 'my marriage,' and the unigram 'mobetterblues' in order written here.
2) User enters and accepts the word 'my.'
3) Hit space.
   4) Expect selection list:
   marriage
   time
   money
5) User enters 6 key.
6) Expect selection list:
   o
   m
   n
   6
   marriage
   money
   mobetterblues
7) User enters 6 key again.
8) Expect selection list:
   on
   no
   mm
   mo
   oo
   money
   mobetterblues Context Predictions and Completions in T9 (Case Sensitivity)
   Leading word is agnostic to case, trailing word is case sensitive. If space is hit with caps-lock on, the predicted word is entirely in upper case.

Use Case:
1) User has recently entered the bigrams 'my MONEY,' 'my time,' and 'MY marriage' in order written here.
2) User enters and accepts the word 'my.'
3) Hit space.
4) Expect selection list:
   marriage
   time
   MONEY
5) User enters clear key.
6) User enters and accepts the word 'MY' without caps-lock on.
7) Expect selection list:
   marriage
   time
   MONEY
8) User enters clear key.
9) User enters and accepts the word 'MY' with caps-lock on.
10) Expect selection list:
   MARRIAGE
   TIME
   MONEY Context Predictions and Completions with UDB Completions in Multitap
   CDB Completions Appear Ahead of UDB Completions.

Use Case:
1) User and has recently entered the bigrams 'my money,' 'my time,' and 'my marriage,', and the unigram 'mobetterblues' in order written here.
2) User enters the word 'my.'
3) Hit space.
4) Expect selection list:
   marriage
   time
   money
5) User enters 'm.'
6) User presses next key.
7) Expect selection list:
   m
   marriage
   money
   mobetterblues
8) User enters 'o.'
9) User presses next key.
10) Expect selection list:
   mo
   money
   mobetterblues Context Predictions and Completions with UDB Completions in T9 (Broken Context)
   CDB Completions Appear Ahead of UDB Completions.

Use Case:
1) User and has recently entered the bigrams 'my money,' 'my time,' and 'my marriage,', and the unigram 'mobetterblues' in order written here.
2) User enters and accepts the word 'my.'
3) Hit space.
4) Hit clear.
5) Hit clear again, or any other cursoring to end up with cursor directly to the right of "my."
6) Enter Space.
7) Expect no context predictions (functional description FD200).

8) User enters 6 key.
9) Expect selection lists with context (functional description FD400).
10) Expect selection list:
    o
    m
    n
    6
    marriage
    money
    mobetterblues
11) User enters 6 key again.
12) Expect selection list:
    on
    no
    mm
    mo
    oo
    money
    mobetterblues Context Predictions and Completions in T9 (Recency Over Frequency)

CDB Completions Appear Ahead OF UDB Completions.

Use Case:
1) User and has recently entered the bigrams, 'my money,' 'my money,' 'my marriage' in order written here.
2) User enters and accepts the word 'my.'
3) Hit space.
4) Expect selection list (more recent 'marriage' comes before more frequent 'money'):
    marriage
    money
5) User enters 6 key.
6) Expect selection list:
    o
    m
    n
    6
    marriage
    money Languages
    CDB is language independent.

Reorder of Non-Completed Words
    RUDB processes around reordering of non-completed words remain unchanged.

Clearing
    Context predictions are not delivered after clearing a current word, but are delivered as the user begins typing again.

Punctuation
    No context predictions are delivered across sentence punctuation.

Aging
    There is no aging of the CDB, the least recent word is replaced by the most recent word entered.

Garbage Collection
    When space is needed to enter a new word into the CDB, the least recent word in the CDB is removed to make room.

Entering Words in MT
    Data for CDB is collected while in MT, and context predictions/completions are delivered in MT.

My Words
    CDB processing occurs on the addition of space character, whether or not the context word was entered in a user maintained MyWords database.

Although the invention is described herein with reference to the preferred embodiment, one skilled in the art will readily appreciate that other applications may be substituted for those set forth herein without departing from the spirit and scope of the present invention. For example, user actions or inputs can effect the automatic changing of the device's state based on context. For example, the system might use context to change a mobile telephone from 'ring' to 'vibrate', during the time that the calendar shows that the user is in a meeting. Another embodiment uses location context to increase the mobile telephone volume when the user is outside or when the telephone detects high levels of background noise.

In another embodiment, the system learns the user habits. For example, based on the learned user action, the system is able to offer services to the user that the user may not be aware of.

In another embodiment, word prediction is based on the previous word context (bigram context), but might also use the previous 'n' words (trigram context, etc).

Accordingly, the invention should only be limited by the Claims included below.

The invention claimed is:

1. A method for prediction of any of user words or user actions, comprising operations of:
    responsive to a user entering an input sequence into a input device or performing a specific action associated with said input device, predicting an entire next word or words that said user wants to enter or an action a user wants to be taken by said device;
    said predicting operation further comprising operations of:
        said user entering a specific symbol or taking a specific action;
        responsive thereto, providing a keyword for a menu based upon context of an immediately preceding user input sequence or action;
        depicting to said user entries previously selected from said menu which are stored in a context database as entries preceded by said keyword;
        reordering said entries in said menu;
        when a menu entry is selected, automatically noting it as having been selected with a menu tag for use as context when re-ordering in the future.

2. The method of claim 1, further comprising:
    responsive to said user entering a specific symbol or taking a specific action, and based upon context of an immediately preceding user input sequence or action, superseding normal menu format by reordering immediate options for a next state/application a user is predicted to go to.

3. The method of claim 2, further comprising the step of:
    automatically performing a most likely option.

4. A computing apparatus, comprising:
    a user input device;
    a display;
    a context database comprising a list of words entered by a user in an order of entry;
    a processor coupled to the input device and display and context database, the processor programmed to perform operations to receive input characters and symbols from the input device, manage output to the display, and perform actions within the apparatus, the operations comprising:

responsive to the user completing entry of a word, searching the context database for occurrences of the entered word and upon finding the entered word in the context database offering to the user one or more words occurring after the entered word in the context database as a predicted next entry;

responsive to context of the apparatus, predicting a user action other than entry of text via the input device and automatically changing apparatus state to carry out the predicted action;

where said context of the apparatus includes arrival of a start time for an entry of an calendar application of the apparatus, and said predicted action comprises invoking a silent mode of operation of the apparatus.

5. A computing apparatus, comprising:

a user input device;

a display;

a context database comprising a list of words entered by a user in an order of entry;

a processor coupled to the input device and display and context database, the processor programmed to perform operations to receive input characters and symbols from the input device, manage output to the display, and perform actions within the apparatus, the operations comprising:

responsive to the user completing entry of a word, searching the context database for occurrences of the entered word and upon finding the entered word in the context database offering to the user one or more words occurring after the entered word in the context database as a predicted next entry;

responsive to context of the apparatus, predicting a user action other than entry of text via the input device and automatically changing apparatus state to carry out the predicted action;

where said context of the apparatus includes user selection of a prescribed menu entry, and said predicted action includes configuring the menu to streamline an expected user-invoked follow up action.

6. A computing apparatus, comprising:

a user input device;

a display;

a context database comprising a list of words entered by a user in an order of entry;

a processor coupled to the input device and display and context database, the processor programmed to perform operations to receive input characters and symbols from the input device, manage output to the display, and perform actions within the apparatus, the operations comprising:

responsive to the user completing entry of a word, searching the context database for occurrences of the entered word and upon finding the entered word in the context database offering to the user one or more words occurring after the entered word in the context database as a predicted next entry;

responsive to context of the apparatus, predicting a user action other than entry of text via the input device and automatically changing apparatus state to carry out the predicted action;

where said context of the apparatus includes a change in application state of a first application, and said predicted action comprises one of the following: automatically opening a second application, streamlining opening of the second application, prioritizing access to functions offered by the second application.

\* \* \* \* \*